United States Patent
Athley et al.

(10) Patent No.: US 9,654,264 B2
(45) Date of Patent: May 16, 2017

(54) BEAM FORMING USING A DUAL POLARIZED ANTENNA ARRANGEMENT

(71) Applicant: Telefonaktiebolaget L M Ericsson (publ), Stockholm (SE)

(72) Inventors: Fredrik Athley, Kullavik (SE); Sven Petersson, Savedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/358,119

(22) PCT Filed: May 8, 2014

(86) PCT No.: PCT/EP2014/059443
§ 371 (c)(1),
(2) Date: May 14, 2014

(87) PCT Pub. No.: WO2015/169368
PCT Pub. Date: Nov. 12, 2015

(65) Prior Publication Data
US 2015/0333885 A1 Nov. 19, 2015

(51) Int. Cl.
*H04B 7/04* (2006.01)
*H04B 7/06* (2006.01)
(Continued)

(52) U.S. Cl.
CPC ......... *H04L 5/0048* (2013.01); *H04B 7/0456* (2013.01); *H04B 7/0617* (2013.01);
(Continued)

(58) Field of Classification Search
CPC ... H04L 5/0048; H04B 7/0408; H04B 7/0456; H04B 7/0469; H04B 7/0617; H04B 7/0684; H04B 7/10
See application file for complete search history.

(56) References Cited

U.S. PATENT DOCUMENTS

2008/0232239 A1\* 9/2008 Mujtaba ............... H04B 7/0669
370/209
2008/0316131 A1\* 12/2008 Apostolos ............... H01Q 9/28
343/756

(Continued)

FOREIGN PATENT DOCUMENTS

EP 2685755 A1 1/2014
JP 2015041857 A \* 3/2015

OTHER PUBLICATIONS

Written and Opinion and Search Report issued in corresponding application No. PCT/EP2014/059443 on Feb. 9, 2015, 12 pages.

*Primary Examiner* — David B. Lugo
(74) *Attorney, Agent, or Firm* — Rothwell, Figg, Ernst & Manbeck, P.C.

(57) ABSTRACT

There is provided beam forming using a dual polarized antenna array. A first set of reference signals for acquiring channel state information is alternatingly transmitted using a dual polarized antenna array in a first polarization direction and in a second polarization direction, respectively. Quantized channel information based on the first set of reference signals is received from a radio transceiver device. Angular information relating to the radio transceiver device is determined based on the quantized channel information. Transmission beams for transmission to the radio transceiver device are determined. The transmission comprises precoder vectors and have relative orthogonal polarizations for beam forming according to the angular information.

32 Claims, 6 Drawing Sheets

(51) Int. Cl.
*H04B 7/10* (2006.01)
*H04L 5/00* (2006.01)
*H04B 7/0456* (2017.01)

(52) U.S. Cl.
CPC ......... *H04B 7/0626* (2013.01); *H04B 7/0658* (2013.01); *H04B 7/0684* (2013.01); *H04B 7/10* (2013.01)

(56) References Cited

U.S. PATENT DOCUMENTS

| | | | | |
|---|---|---|---|---|
| 2009/0046801 | A1* | 2/2009 | Pan | H04B 7/0452 375/267 |
| 2012/0014415 | A1* | 1/2012 | Su | H04B 7/043 375/140 |
| 2013/0229980 | A1* | 9/2013 | Wernersson | H04B 7/0617 370/328 |
| 2013/0321207 | A1* | 12/2013 | Monogioudis | H01Q 1/246 342/373 |
| 2014/0098689 | A1* | 4/2014 | Lee | H04B 7/0469 370/252 |
| 2014/0254514 | A1* | 9/2014 | Mobasher | H04B 7/0486 370/329 |
| 2015/0373601 | A1* | 12/2015 | Benjebbour | H04W 72/082 370/252 |
| 2016/0204920 | A1* | 7/2016 | Benjebbour | H04W 16/28 370/329 |

* cited by examiner

BEAM FORMING USING A DUAL POLARIZED ANTENNA ARRANGEMENT

CROSS-REFERENCE TO RELATED APPLICATION

This application is a 35 U.S.C. §371 National Phase Entry Application from PCT/EP2014/059443, filed May 8, 2014, and designating the United States.

TECHNICAL FIELD

Embodiments presented herein relate to beam forming, and particularly a method, a dual polarized antenna arrangement, and a computer program for beam forming.

BACKGROUND

In communications networks, it may be challenging to obtain good performance and capacity for a given communications protocol, its parameters and the physical environment in which the communications network is deployed.

One component of wireless communications networks where it may be challenging to obtain good performance and capacity is the antennas of network nodes configured for wireless communications; either to/from another network node, and/or to/from a wireless user terminal.

For example, multi-antenna transmission techniques are used in several wireless communication standards, e.g. the Long Term Evolution (LTE) telecommunications standard of the 3rd Generation Partnership Project (3GPP), in order to increase system capacity and coverage. A particular transmission mode is codebook-based precoding in which the radio base station (such as an evolved Node B, or eNB) of the network transmits one or several beam formed data streams to the wireless end-user terminals (denoted user equipment, or UE). The beam forming weights are selected from a standardized codebook based on recommendations transmitted from the UE. In order for the UE to be able to recommend beam forming weights the radio base station first transmits pre-determined reference signals which are used by the UE to estimate the complex channel matrix between the radio base station and UE. This estimate may then be used to determine which weights in the codebook that for the UE will result in the best performance for the current channel state. Since there is only a finite number of eligible beam forming weights (as dictated by the codebook), only an index needs to be transmitted back from the UE to the radio base station. This index is referred to as a precoding matrix indicator (PMI). The radio base station may then select to transmit user data with the precoding matrix recommended by the UE, or with some other precoding matrix. For example, in transmission mode 4 (TM4) the radio base station may use another precoding matrix in the codebook, while in transmission mode 9 (TM9) there is no restriction on what precoding matrix for the radio base station to use. In the latter case, the codebook is only used to feedback quantized channel state information (CSI) whilst the demodulation of user data relies on precoded user-specific reference signals. For this reason, TM9 is sometimes referred to as non-codebook-based precoding.

Further, the maximum number of antenna ports in the LTE release 10 codebook is eight. This puts a limit on the angular resolution in the CSI acquisition and the beam forming gain that can be achieved.

Hence, there is a need for improved beam forming.

SUMMARY

An object of embodiments herein is to provide efficient beam forming.

According to a first aspect there is presented a method for beam forming using a dual polarized antenna array. The method comprises alternatingly transmitting a first set of reference signals for acquiring channel state information using a dual polarized antenna array in a first polarization direction and in a second polarization direction, respectively. The method comprises receiving quantized channel information based on the first set of reference signals from a radio transceiver device. The method comprises determining angular information relating to the radio transceiver device based on the quantized channel information. The method comprises determining transmission beams for transmission to the radio transceiver device, the transmission comprising precoder vectors and having relative orthogonal polarizations for beam forming according to the angular information.

Advantageously this provides efficient beam forming.

Advantageously this may enable high beam forming gain and high angular resolution in channel state information acquisition.

According to a second aspect there is provided a dual polarized antenna arrangement for beam forming. The dual polarized antenna arrangement comprises a processing unit configured to cause a dual polarized antenna array for beam forming to alternatingly transmit a first set of reference signals for acquiring channel state information using a dual polarized antenna array in a first polarization direction and in a second polarization direction, respectively. The processing unit is configured to cause the dual polarized antenna array to receive quantized channel information based on the first set of reference signals from a radio transceiver device. The processing unit is configured to cause the dual polarized antenna array to determine angular information relating to the radio transceiver device based on the quantized channel information. The processing unit is configured to cause the dual polarized antenna array to determine transmission beams for transmission to the radio transceiver device, the transmission comprising precoder vectors and having relative orthogonal polarizations for beam forming according to the angular information.

According to a third aspect there is presented a network node comprising a dual polarized antenna arrangement according to the second aspect.

According to a fourth aspect there is presented a wireless terminal comprising a dual polarized antenna arrangement according to the second aspect.

According to a fifth aspect there is presented a computer program for beam forming, the computer program comprising computer program code which, when run on a processing unit, causes the processing unit to perform a method according to the first aspect.

According to a sixth aspect there is presented a computer program product comprising a computer program according to the fifth aspect and a computer readable means on which the computer program is stored.

According to a seventh aspect there is provided a method for beam forming using a dual polarized antenna array. The method comprises simultaneously transmitting a first set of reference signals for acquiring channel state information using a dual polarized antenna array in a first polarization direction and a second set of reference signals for acquiring channel state information using the dual polarized antenna array in a second polarization direction, respectively. The method comprises receiving quantized channel information based on at least one of the first set of reference signals and the second set of reference signals from a radio transceiver device. The method comprises determining angular information relating to the radio transceiver device based on the quantized channel information. The method comprises determining transmission beams for transmission to the radio transceiver device, the transmission comprising precoder vectors and having relative orthogonal polarizations for beam forming according to the angular information.

Advantageously this enables a large number of antenna ports to be simultaneously used for transmitting reference signals.

Advantageously this enables denser sampling in the acquisition of possible response signals to the thus transmitted reference signals, improving accuracy in channel estimation and thereby enabling higher beam forming gain, for example in subsequent data transmission.

According to an eight aspect there is provided a dual polarized antenna arrangement for beam forming. The dual polarized antenna arrangement comprises a processing unit. The processing unit is configured to cause a dual polarized antenna array for beam forming to simultaneously transmit a first set of reference signals for acquiring channel state information in a first polarization direction and a second set of reference signals for acquiring channel state information in a second polarization direction, respectively. The processing unit is configured to receive quantized channel information based on at least one of the first set of reference signals and the second set of reference signals from a radio transceiver device. The processing unit is configured to determine angular information relating to the radio transceiver device based on the quantized channel information. The processing unit is configured to determine transmission beams for transmission to the radio transceiver device, the transmission comprising precoder vectors and having relative orthogonal polarizations for beam forming according to the angular information.

According to a ninth aspect there is presented a network node comprising a dual polarized antenna arrangement according to the eight aspect.

According to a tenth aspect there is presented a wireless terminal comprising a dual polarized antenna arrangement according to the eight aspect.

According to an eleventh aspect there is presented a computer program for beam forming, the computer program comprising computer program code which, when run on a processing unit, causes the processing unit to perform a method according to the seventh aspect.

According to a twelfth aspect there is presented a computer program product comprising a computer program according to the eleventh aspect and a computer readable means on which the computer program is stored.

It is to be noted that any feature of the first, second, third, fourth, fifth sixth, seventh, eight, ninth, tenth, eleventh and twelfth aspects may be applied to any other aspect, wherever appropriate. Likewise, any advantage of the first aspect may equally apply to the second, third, fourth, fifth, sixth, seventh, eight, ninth, tenth, eleventh and/or twelfth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step illustrated by dashed lines should be regarded as optional.

In general terms, the codebooks specified in the Long Term Evolutions (LTE) telecommunications standards have been designed for being used with one-dimensional (1-D) antenna arrays, typically horizontal linear arrays. As noted above, the maximum number of antenna ports in the LIE release 10 codebook is eight. This puts a limit on the angular resolution as given by the CSI acquisition and the beam forming gain that can be achieved.

In more detail, the LTE release 10 codebook was designed with dual-polarized antenna arrays in mind. The codebook has a so called double codebook structure which means that a precoder matrix W, is obtained by multiplying two matrices, W1, and W2, belonging to two distinct codebooks; see 3GPP TS 36.213 V11.0.0 of September 2012 for further details. The rationale of this is that W1 is targeted to capture long-term channel characteristics while W2 is supposed to track short-term variations. Therefore, the feedback rate for W1 and W2 can be different. Applied to a dual-polarized antenna array, weight vectors in W1 may be applied over co-polarized antenna elements in order to steer beams in the most favorable directions which typically vary slowly over time, whilst W2 may account for tracking fast variations in the polarization states of the channel.

The release 10 codebook supports up to 8 transmit antennas which means that, currently, 4 co-polarized antennas per polarization are utilized for the actual beam forming if a dual-polarized antenna array is used. This sets a limit on the angular resolution in, for example, channel state information acquisition as well as on the beam forming gain that can be achieved in the transmission.

According to some of the herein disclosed embodiments this limit may be improved by a factor of two by sequentially applying the full codebook (and thus transmitting all reference signals) on one polarization at a time (or frequency subband, or code resource). This means that the codebook may be used with 16 antenna elements instead of 8. More specifically, 8 co-polarized antenna elements may used at a time (or frequency subband, or code resource) in, for example, channel state information acquisition whilst all 16 antenna elements may be used simultaneously in the transmission. This approach may, for example, be enabled by the introduction of precoded demodulation reference signals (DM-RS) in the LTE standard, decoupling the precoding weights used for the transmission of user data from the precoding weights used in the feedback of channel state information.

The embodiments disclosed thus herein relate to improved beam forming. In order to obtain such beam forming there is provided a dual polarized antenna arrangement, a method performed by a processing unit, a computer program comprising code, for example in the form of a computer program product, that when run on a processing unit, causes the processing unit to perform the method.

Figure 1:
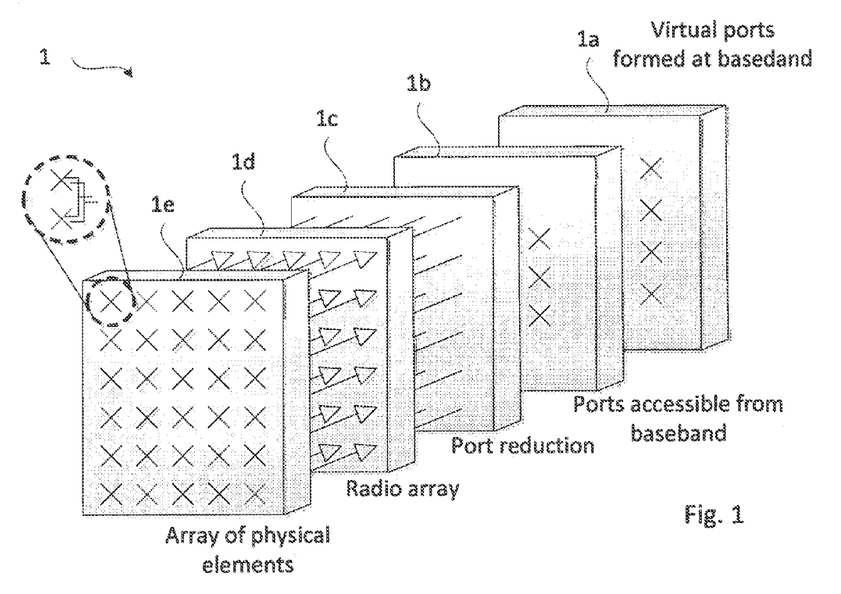
FIGS. 1 to 3, 10, and 11 are schematic diagrams illustrating different aspects of two dimensional antenna arrays according to embodiments.

FIG. 1 is a schematic block diagram illustrating an example architecture of a dual polarized antenna array 1 for which embodiments presented herein can be applied. The dual polarized antenna array 1 may be an N1-by-N2 two-dimensional antenna array, where N1>1 and N2>1. However, although illustrating such a two dimensional antenna array in FIG. 1, the herein disclosed embodiments are also applicable for a one dimensional antenna array. The antenna front end comprises an array 1e of physical antenna elements where each antenna element may be a subarray of several radiating antenna elements connected via a feed network to one physical antenna port (per polarization) for each physical element. Each physical antenna port is connected to a radio chain as comprised in a radio array 1d. The number of antenna ports in block 1b accessible to baseband signal processing may be reduced via a port reduction block 1c that creates new antenna ports that are (linear) combinations of the input antenna ports. In the baseband signal processing block 1a virtual antenna ports may be created by matrix multiplications. These virtual antenna ports may be of different type. For example, in LTE they may for a radio base station be common reference signals (CRS) at ports 0-3, channel state information reference signals (CSI-RS) at port 15-22, and UE-specific reference signals at ports 7-14. In some implementations one or several blocks of the in the dual polarized antenna array 1 in FIG. 1 may be removed.

Figure 3:
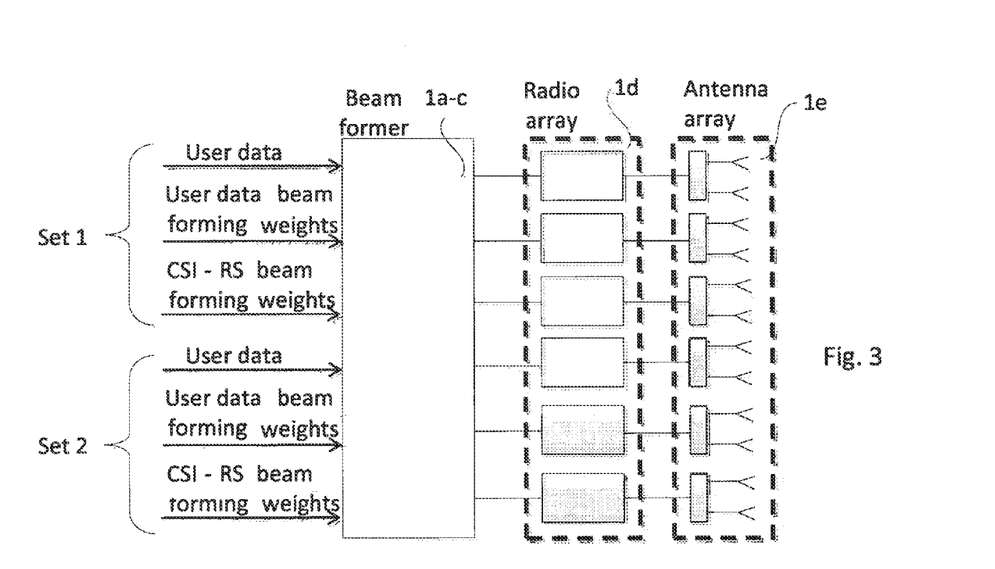

FIG. 3 is a schematic block diagram illustrating a possible implementation of the dual polarized antenna array 1 of FIG. 1. It comprises a beam former comprising blocks 1a, 1b, 1c of FIG. 1, a radio array 1d and a physical antenna array 1e. The beam former 1a-c is configured to receive user data, beam forming weights for the user data, and beam forming weights for reference signals, such as CSI-RS. The beam former 1a-c may be configured to receive one set of user data, beam forming weights for the user data, and beam forming weights for reference signals. However, as will be further disclosed below, the beam former 1a-c may be configured to receive at least two sets (in FIG. 3 schematically illustrated by Set 1 and Set 2, respectively) of user data, beam forming weights for the user data, and beam forming weights for reference signals.

Figure 4A:
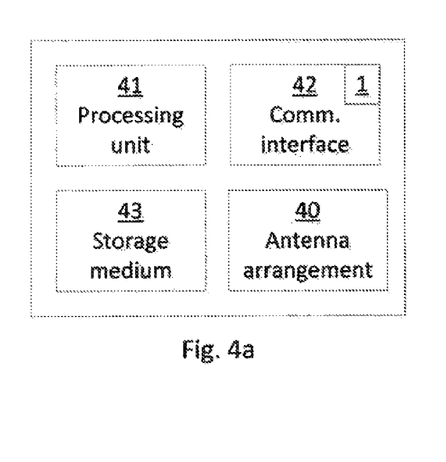
FIG. 4a is a block diagram showing functional units of an antenna arrangement according to an embodiment.

FIG. 4a schematically illustrates, in terms of a number of functional units, the components of an antenna arrangement 40 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 70 (as in FIG. 7), e.g. in the form of a storage medium 43. If implemented as an ASIC (or an FPGA) the processing unit 41 may by itself implement such instructions. Thus the processing unit 41 is thereby arranged to execute methods as herein disclosed. The storage medium 43 may also comprise persistent storage, which, for example, can be any single one or combination of magnetic memory, optical memory, solid state memory or even remotely mounted memory. The antenna arrangement 40 may further comprise a communications interface 42 for communications with radio transceiver devices, such as network nodes 51 and wireless terminals 61. As such the communications interface 42 may comprise one or more transmitters and receivers, comprising analogue and digital components and a dual polarized antenna array 1 for radio communications. The processing unit 41 controls the general operation of the antenna arrangement 40 e.g. by sending data and control signals to the communications interface 42 and the storage medium 43, by receiving data and reports from the communications interface 42, and by retrieving data and instructions from the storage medium 43. Other components, as well as the related functionality, of the antenna arrangement 40 are omitted in order not to obscure the concepts presented herein.

Figures 4B, 6:
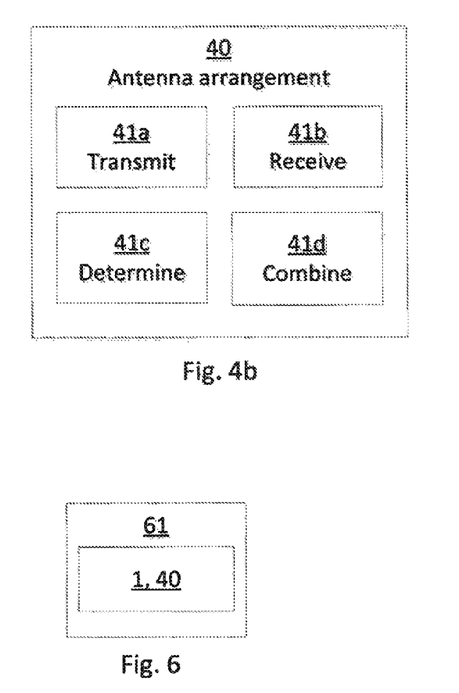
FIG. 4b is a block diagram showing functional modules of an antenna arrangement according to an embodiment.
FIG. 6 schematically illustrates a wireless terminal comprising an antenna arrangement according to embodiments.

FIG. 4b schematically illustrates, in terms of a number of functional modules, the components of an antenna arrangement 40 according to an embodiment. The antenna arrangement 4 of FIG. 4b comprises a transmit module 41a, a receive module 41b, and a determine module 41c. The antenna arrangement 40 of FIG. 4b may further comprises a number of optional functional modules, such a combine module 41d. The functionality of each functional module 41a-d will be further disclosed below in the context of which the functional modules 41a-d may be used. In general terms, each functional module 41a-d may be implemented in hardware or in software. The processing unit 41 may thus be arranged to from the storage medium 43 fetch instructions as provided by a functional module 41a-d and to execute these instructions, thereby performing any steps as will be disclosed hereinafter.

Figure 5:
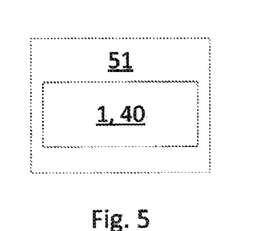
FIG. 5 schematically illustrates a network node comprising an antenna arrangement according to embodiments.

The dual polarized antenna array 1 and/or the antenna arrangement 40 may be provided as integrated circuits, as standalone devices or as a part of a further device. For example, the dual polarized antenna array 1 and/or antenna arrangement 40 may be provided in a radio transceiver device, such as in a network node 51 and/or a wireless terminal 61. FIG. 5 illustrates a network node 51 comprising at least one dual polarized antenna array 1 and/or antenna arrangement 40 as herein disclosed. The network node 51 may be a BTS, a NodeB, an eNB, a repeater, a backhaul node, or the like. FIG. 6 illustrates a wireless terminal 61 comprising at least one dual polarized antenna array 1 and/or antenna arrangement 40 as herein disclosed. The wireless terminal 61 may be a user equipment (UE), a mobile phone, a tablet computer, a laptop computer, etc. or the like.

The dual polarized antenna array 1 and/or antenna arrangement 40 may be provided as an integral part of the further device. That is, the components of the dual polarized antenna array 1 and/or antenna arrangement 40 may be integrated with other components of the further device; some components of the further device and the dual polarized antenna array 1 and/or antenna arrangement 40 may be shared. For example, if the further device as such comprises a processing unit, this processing unit may be arranged to perform the actions of the processing unit 41 associated with the antenna arrangement 40. Alternatively the dual polarized antenna array 1 and/or antenna arrangement 40 may be provided as separate units in the further device.

Figure 7:
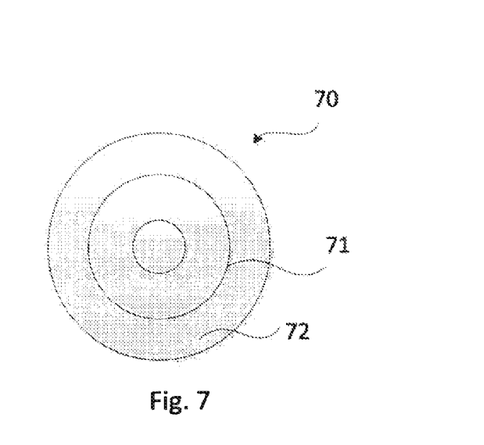
FIG. 7 schematically illustrates a computer program product according to an embodiment.

FIGS. 8 9, 12 and 13 are flow chart illustrating embodiments of methods for beam forming. The methods are performed by the processing unit 41. The methods are advantageously provided as computer programs 71. FIG. 7 shows one example of a computer program product 70 comprising computer readable means 72. On this computer readable means 72, a computer program 71 can be stored, which computer program 71 can cause the processing unit 41 and thereto operatively coupled entities and devices, such as the communications interface 42 (and hence the dual polarized antenna array 1) and the storage medium 43, to execute methods according to embodiments described herein. The computer program 71 and/or computer program product 70 may thus provide means for performing any steps as herein disclosed.

In the example of FIG. 7, the computer program product 70 is illustrated as an optical disc, such as a CD (compact disc) or a DVD (digital versatile disc) or a Blu-Ray disc. The computer program product 70 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 71 is here schematically shown as a track on the depicted optical disk, the computer program 71 can be stored in any way which is suitable for the computer program product 70.

Figure 8:
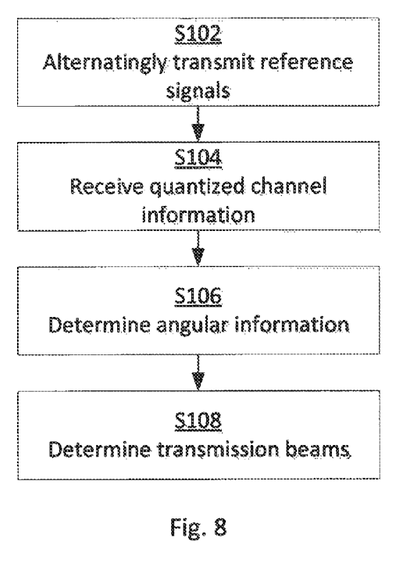
FIGS. 8, 9, 12, and 13 are flowcharts of methods according to embodiments.

Reference is now made to FIG. 8 illustrating a method for beam forming using a dual polarized antenna array 1 according to an embodiment.

Figure 2:
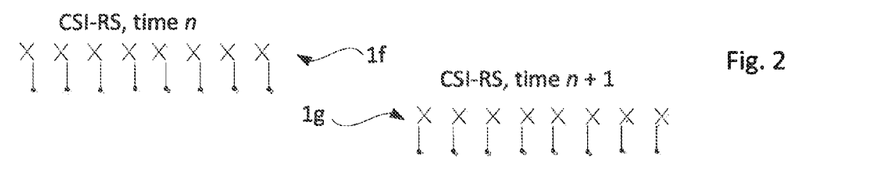

The method comprises in a step S102 alternatingly transmitting a first set of reference signals for acquiring channel state information using a dual polarized antenna array 1 in a first polarization direction 1$f$ (see, FIG. 2) and in a second polarization direction 1$g$ (see, FIG. 2), respectively. The processing unit 41 may be configured to cause the antenna array 1 to perform step S102.

Figure 10:
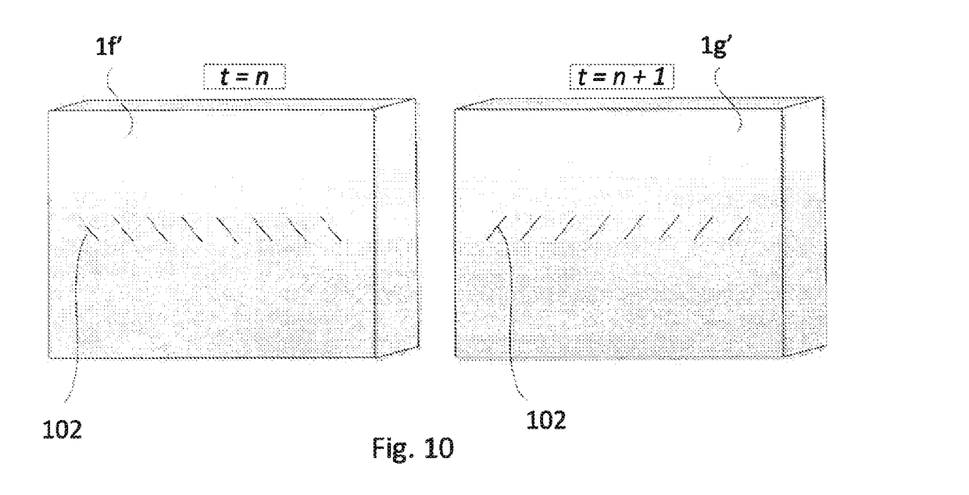

FIG. 10 schematically illustrates phase center positions, one of which is identified at reference numeral 102, and polarizations of virtual antenna ports at two consecutive time instants (or frequency subbands, or code resources, see below) using a first polarization direction 1$f$ and a second polarization direction 1$g'$ according to an embodiment. The virtual antenna ports may be created by an antenna architecture such as the one in FIG. 1. In FIG. 10 the virtual antenna ports form an 8-by-1 (per polarization) linear antenna array.

Figure 11:
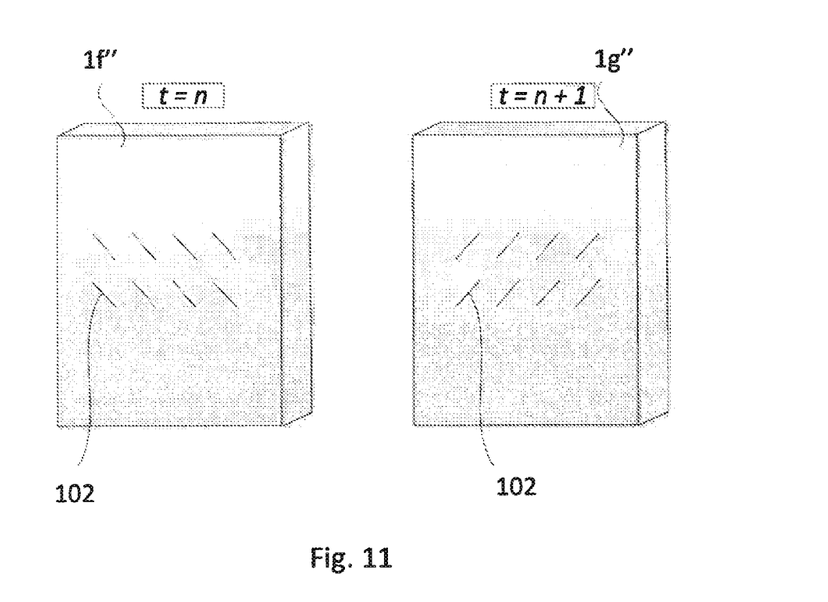

FIG. 11 schematically illustrates phase center positions and polarizations of virtual antenna ports at two consecutive time instants (or frequency subbands, or code resources, see below) using a first polarization direction 1$f$ and a second polarization direction 1$g''$ according to an embodiment. The virtual antenna ports may be created by an antenna architecture such as the one in FIG. 1. In FIG. 11 the virtual antenna ports form a 4-by-2 (per polarization) rectangular antenna array as illustrated by the phase center positions 102.

It is assumed that a radio transceiver device receives the reference signals for channel state information as transmitted in step S102 and provides a response in terms of quantized channel information thereto. The method therefore comprises in a step S104 receiving quantized channel information based on the first set of reference signals from a radio transceiver device. The processing unit 41 may be configured to cause the antenna array 1 to perform step S104.

The quantized channel information is used to determine a relative direction to the radio transceiver device. The method thus comprises in a step S106 determining angular information relating to the radio transceiver device based on the quantized channel information. Further aspects of the angular information will be provided below. The processing unit 41 may be configured to cause the antenna array 1 to perform step S106.

Further, transmission beams to the radio transceiver device are determined. The method thus comprises in a step S108 determining transmission beams for transmission to the radio transceiver device. The transmission beams comprises precoder vectors and have relative orthogonal polarizations for beam forming according to the angular information. This may be a rank 2 transmission, or a rank 2K transmission, where K is the number of directions, i.e., where one layer (or user data stream) per beam and polarization is transmitted. The processing unit 41 may be configured to cause the antenna array 1 to perform step S108.

Embodiments relating to further details of beam forming using a dual polarized antenna array 1 will now be disclosed.

The quantized channel information may correspond to at least one transmission of one reference signal in one polarization direction.

The angular information may represent an angle of departure (AOD) to the radio transceiver device.

The reference signals may be channel state information reference signals (CSI-RS). As noted above, a network node 51 may comprise a two dimensional antenna arrangement 1 as herein disclosed. The network node 51 may thus be configured to transmit CSI-RS as outlined in step S102.

The quantized channel information may be a precoding matrix indicator (PMI) report. The network node 51 may thus be configured to receive PMI reports as outlined in step S104. Based on, for example, such PMI reports from the radio transceiver device receiving the reference signals transmitted in S102, beam forming may be performed using the whole antenna array.

The reference signals may be sounding reference signals (SRS). As noted above, a wireless terminal 61 may comprise a two dimensional antenna arrangement 1 as herein disclosed. The wireless terminal 61 may thus be configured to transmit SRS as outlined in step S102.

At least one of the precoder vectors may correspond to linear phase progression over co-polarized antenna elements in one polarization direction of the dual polarized antenna array 1.

It may be assumed, for example, that eight CSI-RS ports can be formed by combining sufficiently many radiating elements so that all CSI-RS ports have the same power pattern (but optionally can have different polarizations).

The herein disclosed embodiments are applicable for different types of dual polarized antenna arrays 1. For example, according to an embodiment the dual polarized antenna array is an N1-by-N2 two-dimensional antenna array, where N1>1 and N2>1 are integers. However, according to other embodiments the dual polarized antenna array may have another shape, for example being a circular two-dimensional antenna array or a one dimensional antenna array.

There may be different ways to alternatingly transmitting the reference signals, as in step S102. For example, the reference signals may be alternatingly transmitted in the time domain, in the frequency domain, and in the code domain.

In this respect, multiple CSI-RS processes in LTE are not transmitted completely simultaneously in completely the same frequency. Some CSI-RS signals are transmitted in different physical resource elements, i.e., using different subcarriers and orthogonal frequency-division multiplexing (OFDM) symbols. However, the multiple CSI-RS processes are transmitted in the same physical resource block (consisting of 12 subcarriers and 7 OFDM symbols) so at this level of granularity in the time-frequency grid they are regarded as transmitted simultaneously in the same frequency band. Thus, when transmitting simultaneously at the same frequency in LTE is meant in the same physical resource blocks.

According to one embodiment the reference signals are alternatingly transmitted over time (and in the same frequency band). For example, one set of reference signals in the first polarization direction may be transmitted in a first time slot, and one set of reference signals in the second polarization direction may be transmitted (in the same frequency band) in a second time slot. After having transmitted reference signals in the second time slot, reference signals may again be transmitted as in the first time slot, and so on. For example, one set of reference signals in the first polarization direction may be transmitted at time slot n (or every 2n:th time slot) and one set of reference signals in the second polarization direction may be transmitted at time slot n+1 (or every 2n+1:th), where n is an integer.

According to one embodiment the reference signals are alternatingly transmitted over frequency (and simultaneously over time). For example, one set of reference signals in the first polarization direction may be transmitted in a first frequency subband, and one set of reference signals in the second polarization direction may be transmitted (simultaneously over time) in a second frequency subband.

According to one embodiment the reference signals are alternatingly transmitted using different code resources (and simultaneously over time and/or in the same frequency band). The code resources may be based on binary block codes. For example, one set of reference signals in the first polarization direction may be transmitted using a first code resource, and one set of reference signals in the second polarization direction may be transmitted (simultaneously over time and/or in the same frequency band) using a second code resource. The first code resource and the second code resource may be orthogonal in relation to each other.

Figure 9:
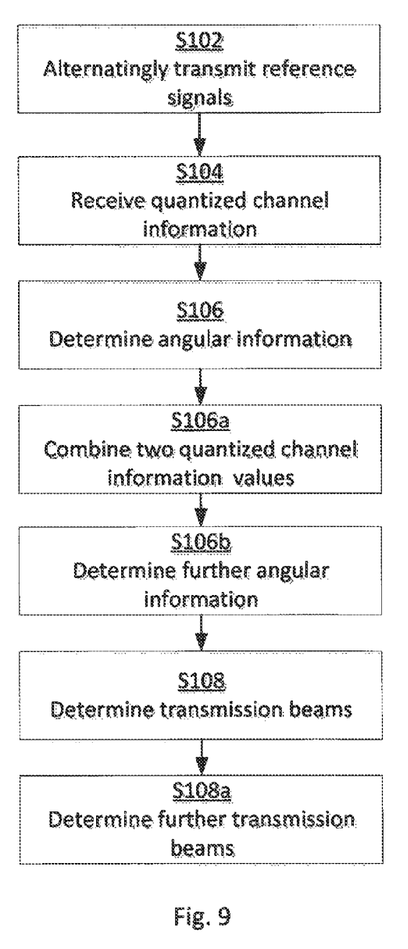

Reference is now made to FIG. 9 illustrating methods for beam forming using a dual polarized antenna array 1 according to further embodiments.

Since the CSI-RSs are transmitted sequentially on co-polarized antenna elements the UEs may only report rank 1 in spatially correlated channels. However, it is known a priori that rank 2 usually gives higher performance since orthogonal polarizations will fade independently in typical channels. Therefore, the antenna arrangement 40 (for example being part of a network node 51) can override the rank 1 recommendations from the radio transceiver devices and force rank 2 transmissions. If this hypothesis proves to be wrong, which could be detected by e.g. monitoring ACK/NACK statistics, the antenna arrangement 40 may fall back to a standard transmission of reference signals, such as CSI-RS. In that case a virtual antenna port mapping should be applied so that all power amplifiers are still fully utilized. Further, as disclosed in more detail below, the herein disclosed embodiments are also applicable for higher-rank transmissions.

The way the transmissions of the reference signals are performed according to the herein disclosed embodiments may destroy any quantized channel information, such as PMI, regarding polarization. However, the actual polarization state in the transmission may not be important since the polarization of the channel and the receiving antennas in the radio transceiver device receiving the reference signals anyways typically random and can be estimated by the receivers of the radio transceiver device. The two layers are transmitted in orthogonal polarizations so as not to introduce any correlation between the layers.

According to embodiments, two quantized channel information values (e.g., provided as two PMI reports) may be combined. Hence, according to embodiments the determining of the angular information further comprises an optional step S106a of combining two quantized channel information values, each corresponding to at least one transmission of one set of reference signals in one polarization direction. Thus, the combining may be achieved by means of a weighted average of estimates of the angular information derived from the two quantized channel information values. According to embodiments channel quality indicator (CQI) values may be used as weighting factors. Thus, determining the weighted average may involve using weighting factors based on CQI values received from the radio transceiver device.

The herein disclosed embodiments are applicable for higher-rank transmissions. If a radio transceiver device receiving the reference signals recommends a rank-k transmission, k AODs may be estimated instead of one. Precoding vectors that create orthogonally polarized beams in these directions may then be determined. Hence, according to embodiments the method further comprises an optional step S106b of determining further angular information relating to the radio transceiver device based on the quantized channel information. The method may then comprise an optional step S108a of determining further transmission beams with relative orthogonal polarizations for beam forming according to the further angular information.

Figure 12:
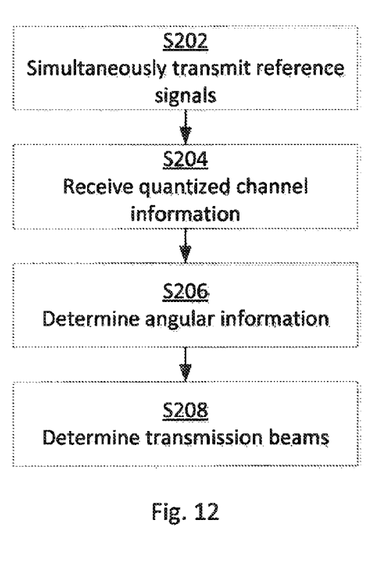

Reference is now made to FIG. 12 illustrating a method for beam forming using a dual polarized antenna array 1 according to an embodiment.

As noted above, the beam former 1a-c of FIG. 3 may be configured to receive at least two sets of user data, beam forming weights for the user data, and beam forming weights for reference signals. Further details relating thereto will now be disclosed. According to embodiments multiple sets of reference signals, such as multiple CSI-RS processes, may simultaneously be transmitted from the dual polarized antenna array 1. The multiple sets of reference signals may be used for increasing the number of antenna ports that are used for CSI estimation. This may improve the angular resolution (and/or yielding dense channel estimations) in the CSI estimation and thereby make it useful to use a correspondingly increased number of antenna ports for the beam forming of the user data, which in turn may improve the beam forming gain.

A method for beam forming using a dual polarized antenna array 1, comprises a step S202 of simultaneously transmitting a first set of reference signals for acquiring channel state information using the dual polarized antenna array 1 in a first polarization direction 1f and a second set of reference signals for acquiring channel state information using the dual polarized antenna array 1 in a second polarization direction 1g. The processing unit 21 is configured to cause the dual polarized antenna array 1 to perform step S202.

The method further comprises a step S204 of receiving quantized channel information based on at least one of the first set of reference signals and the second set of reference signals from a radio transceiver device. The processing unit 21 is configured to cause the dual polarized antenna array 1 to perform step S204.

The method further comprises a step S206 of determining angular information relating to the radio transceiver device based on the quantized channel information. The processing unit 21 is configured to perform step S206.

The method further comprises a step S208 of determining transmission beams for transmission to the radio transceiver device, the transmission comprising precoder vectors and having relative orthogonal polarizations for beam forming according to the angular information. The processing unit 21 is configured to perform step S208.

This may alleviate the need for several CSI-RS transmissions of a single process over multiple time slots (or frequency subbands, see above). Another possible advantage with this approach exists if the radio transceiver device receiving the reference signals transmitted in S102 reports CSI based on an average of several CSI-RS transmissions over time or frequency. Then the CSI based on different polarization directions may be mixed up. By using simultaneous transmission of multiple CSI-RS processes there may be no such problem.

Figure 13:
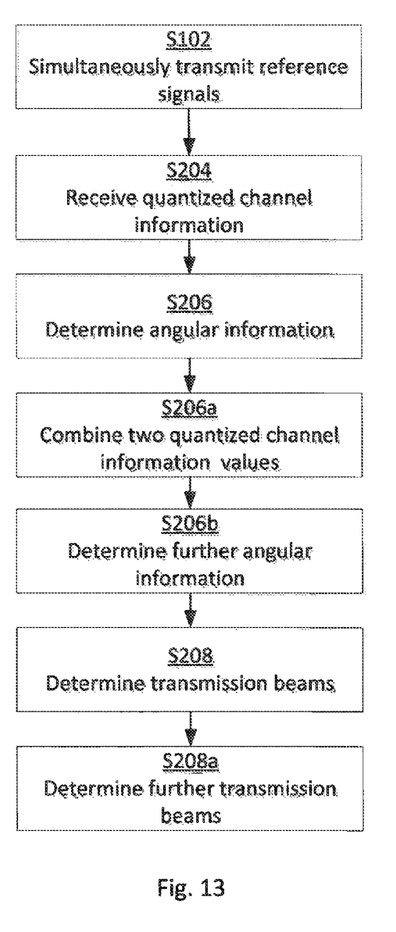

Reference is now made to FIG. 13 illustrating methods for beam forming using a dual polarized antenna array 1 according to further embodiments.

As disclosed above, the quantized channel information may correspond to at least one transmission of one reference signal in one polarization direction.

As in step S106a, determining the angular information may further comprises an optional step S206a of combining two quantized channel information values, each corresponding to at least one transmission of one reference signal in one polarization direction. The processing unit 21 may be configured to perform step S206a.

As disclosed above, combining may be achieved by means of a weighted average of estimates of the angular information derived from the two quantized channel information values.

As disclosed above, determining the weighted average may involve using weighting factors based on channel quality indicator (CQI) values received from the radio transceiver device.

As disclosed above, at least one of the precoder vectors may correspond to linear phase progression over co-polarized antenna elements in one polarization direction of the dual polarized antenna array 1.

As disclosed above, the transmission beams may have a common power radiation pattern.

As in steps S106b and S108a the method may further comprise an optional step S206b of determining further angular information relating to the radio transceiver device based on the quantized channel information; and an optional step S208a of determining further transmission beams with relative orthogonal polarizations for beam forming according to the further angular information. The processing unit 21 may be configured to perform step S206b and step S208a.

As disclosed above, the dual polarized antenna array may be an N1-by-N2 two-dimensional antenna array, where N1>1 and N2>1.

As disclosed above, the angular information may represent an angle of departure (AOD) to the radio transceiver device.

As disclosed above, the reference signals may be channel state information reference signals, CSI-RS.

As disclosed above, the quantized channel information may be a precoding matrix indicator (PMI) report.

As disclosed above, the reference signals may be sounding reference signals (SRS).

One particular embodiment incorporating features and steps as disclosed above will now be disclosed. This particular embodiment relates to a method as performed by the network node 51 and hence the radio transceiver device is embodied as the wireless terminal 61.

S302: The network node 51 transmits CSI-RS on all virtual antenna ports having a first polarization direction, see left part of FIGS. 2, 10, and/or 11. Performing S302 may include performing any of steps S102 and S202.

S304: The network node 51 collects PMI reports sent from the wireless terminal 61 in response to the transmission in S302. Performing 3204 may include performing any of steps S104 and S204.

S306: The network node 51 transmits CSI-RS on all virtual antenna ports having a second polarization direction, see right part of FIGS. 2, 10, and/or 11. Performing S306 may include performing any of steps S102 and S202.

S308: The network node 51 collects any PMI reports sent from the wireless terminal 61 in response to the transmission in S306. Performing S308 may include performing any of steps S104 and S204.

S310: The network node 51 uses the PMI reports collected in S304 and S306 to estimate angles-of-departure (AODs) to the wireless terminal 61. The AOD can be the line-of-sight direction to the wireless terminal 61 or the dominating propagation path to the wireless terminal 61 which can be a different direction, e.g., to some reflecting object in the channel between the network node 51 and the wireless terminal 61. For a reasonably well calibrated antenna array, a PMI will correspond to a distinct AOD. Therefore the PMI reports can be used for AOD estimation. The reports from S304 and S308 may be combined by, e.g., taking the average of the two individual AOD estimates, possibly weighted by corresponding channel quality indicator (CQI) values in order to obtain a higher level of confidence in the report. Performing S310 may include performing any of steps S106, S106a, S106b, S206, S206a, and S206b.

S312: The network node 51 determines a precoding vector for a first transmission beam. This transmission beam shall point in the estimated AOD. In the simplest case this precoding vector is just a linear phase progression over, say, 8 co-polarized antenna elements in one of the intrinsic polarizations of the antenna array. Performing S312 may include performing any of steps S108,S108a, S208, and S208a.

S314: The network node 51 determines a precoding vector for a second transmission beam that has the same power radiation pattern as the first transmission beam in S312, but has a polarization direction that is orthogonal to that of the transmission first beam in all directions. This precoding vector may be determined using the method in PCT/EP2010/001349. Performing S312 may include performing any of steps S108, S108a, S208, and S208a.

In summary, according to some embodiments disclosed herein, CSI may be obtained for an antenna array with up to 16 antenna ports by an alternating transmission of CSI-RS in one polarization direction at a time in a dual polarized antenna array. In this way the directions to the dominating paths of a radio transceiver device receiving the CSI-RS can be estimated with high angular resolution. Based on these direction estimates, beam forming weights for one polarization may first be determined. Next, beam forming weights that produce a beam with the same power radiation pattern as the first beam but with orthogonal polarization may be determined. Data may then be transmitted to the radio transceiver device over two layers using the determined beam forming weights.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For examples, although relating to LTE releases 10 and 11, the herein disclosed embodiments may also be applicable to earlier LTE releases by using a similar transmission scheme for the cell-specific reference signals and, e.g., transmission mode 7. For examples, although using LTE specific terminology, the herein disclosed embodiments may also be applicable to communications networks not based on LTE, mutatis mutandis.

The invention claimed is:

1. A method performed by an antenna apparatus for beam forming using a dual polarized antenna array of the antenna apparatus, comprising the steps of:
   alternatingly transmitting, from the antenna apparatus, a first set of reference signals for acquiring channel state information using a dual polarized antenna array in a first polarization direction and in a second polarization direction that is different than the first polarization direction;
   receiving, at the antenna apparatus, quantized channel information based on the first set of reference signals from a radio transceiver device;
   determining, by the antenna apparatus, angular information relating to the radio transceiver device based on the quantized channel information;
   determining, by the antenna apparatus, a dominating propagation path to the radio transceiver device based on the determined angular information; and
   determining, by the antenna apparatus, transmission beams for transmission to the radio transceiver device, the transmission comprising precoder vectors and having relative orthogonal polarizations for beam forming according to the determined dominating propagation path to the radio transceiver device, wherein
   receiving the quantized channel information comprises receiving a first precoding matrix indicator (PMI) report transmitted by the radio transceiver device and a second PMI report transmitted by the radio transceiver device;
   determining the angular information relating to the radio transceiver device based on the quantized channel information comprises: 1) determining a first angle of departure (AOD) value (AOD1) based on the first PMI report and 2) determining a second AOD value (AOD2) based on the second PMI report; and
   determining the dominating propagation path to the radio transceiver device based on the determined angular information comprises calculating a third AOD value using the first AOD value and the second AOD value, wherein
   the third AOD value indicates the dominating propagation path to the radio transceiver device.

2. The method according to claim 1, wherein the quantized channel information corresponds to at least one transmission of one reference signal in one polarization direction.

3. The method according to claim 1, wherein the determining of said angular information further comprises:
   combining two quantized channel information values, each corresponding to at least one transmission of one reference signal in one polarization direction.

4. The method according to claim 3, wherein said combining is achieved by means of a weighted average of estimates of the angular information derived from the two quantized channel information values.

5. The method according to claim 4, wherein determining said weighted average involves using weighting factors based on channel quality indicator (CQI) values received from the radio transceiver device.

6. The method according to claim 1, wherein at least one of the precoder vectors correspond to linear phase progression over co-polarized antenna elements in one polarization direction of the dual polarized antenna array.

7. The method according to claim 1, wherein the transmission beams have a common power radiation pattern.

8. The method according to claim 1, further comprising:
   determining further angular information relating to the radio transceiver device based on the quantized channel information; and
   determining further transmission beams with relative orthogonal polarizations for beam forming according to the further angular information.

9. The method according to claim 1, wherein the reference signals are alternatingly transmitted over time.

10. The method according to claim 1, wherein the reference signals are alternatingly transmitted over frequency, wherein said one reference signal in said first polarization direction is transmitted in a first frequency subband, and wherein said one reference signal in said second polarization direction is transmitted in a second frequency subband.

11. The method according to claim 1, wherein the reference signals are alternatingly transmitted using different code resources.

12. The method according to claim 1, wherein the dual polarized antenna array is an N1-by-N2 two-dimensional antenna array, where N1>1 and N2>1.

13. The method according to claim 1, wherein the reference signals are channel state information reference signals (CSI-RS).

14. The method according to claim 1, wherein the quantized channel information is a precoding matrix indicator (PMI) report.

15. The method according to claim 1, wherein the reference signals are sounding reference signals, SRS.

16. The method of claim 1, wherein calculating the third AOD value comprises calculating ((w1×AOD1)+(w2×AOD2))/2, wherein w1 is a first weight value that is less than or equal to 1 and greater than 0, and w2 is a second weight value that is less than or equal to 1 and greater than zero.

17. A method performed by an antenna apparatus for beam forming using a dual polarized antenna array of the antenna apparatus, comprising the steps of:
   simultaneously transmitting, by an antenna apparatus, a first set of reference signals for acquiring channel state information using a dual polarized antenna array in a first polarization direction and a second set of reference signals for acquiring channel state information using said dual polarized antenna array in a second polarization direction, respectively;

receiving, at the antenna apparatus, quantized channel information based on at least one of the first set of reference signals and the second set of reference signals from a radio transceiver device;

determining, by the antenna apparatus, angular information relating to the radio transceiver device based on the quantized channel information;

determining, by the antenna apparatus, a dominating propagation path to the radio transceiver device based on the determined angular information; and determining, by the antenna apparatus, transmission beams for transmission to the radio transceiver device, the transmission comprising precoder vectors and having relative orthogonal polarizations for beam forming according to the determined dominating propagation path to the radio transceiver device, wherein the determining of said angular information further comprises combining two quantized channel information values, each corresponding to at least one transmission of one reference signal in one polarization direction, and said combining is achieved by means of a weighted average of estimates of the angular information derived from the two quantized channel information values.

18. The method according to claim 17, wherein the quantized channel information corresponds to at least one transmission of one reference signal in one polarization direction.

19. The method according to claim 17, wherein determining said weighted average involves using weighting factors based on channel quality indicator, CQI, values received from the radio transceiver device.

20. The method according to claim 17, wherein at least one of the precoder vectors correspond to linear phase progression over co-polarized antenna elements in one polarization direction of the dual polarized antenna array.

21. The method according to claim 17, wherein the transmission beams have a common power radiation pattern.

22. The method according to claim 17, further comprising:
determining further angular information relating to the radio transceiver device based on the quantized channel information; and
determining further transmission beams with relative orthogonal polarizations for beam forming according to the further angular information.

23. The method according to claim 17, wherein the dual polarized antenna array is an N1-by-N2 two-dimensional antenna array, where N1>1 and N2>1.

24. The method according to claim 17, wherein the reference signals are channel state information reference signals, CSI-RS.

25. The method according to claim 17, wherein the quantized channel information is a precoding matrix indicator, PMI, report.

26. The method according to claim 17, wherein the reference signals are sounding reference signals, SRS.

27. A dual polarized antenna arrangement for beam forming, comprising:
a memory; and
a processing unit coupled to the memory and comprising one or more processors, the processing unit being configured to:
cause a dual polarized antenna array for beam forming to alternatingly transmit a first set of reference signals for acquiring channel state information using a dual polarized antenna array in a first polarization direction and in a second polarization direction, respectively;
cause said dual polarized antenna array for beam forming to receive quantized channel information based on the first set of reference signals from a radio transceiver device;
estimate, based on the quantized channel information received from the radio transceiver device, a dominating propagation path to the radio transceiver device; and
determine transmission beams for transmission to the radio transceiver device, the transmission comprising precoder vectors and having relative orthogonal polarizations for beam forming according to the dominating propagation path to the radio transceiver device, wherein
the quantized channel information comprises a first precoding matrix indicator (PMI) report transmitted by the radio transceiver device and a second PMI report transmitted by the radio transceiver device, and
the processing unit is configured to estimate the dominating propagation path by: 1) determining a first angle of departure (AOD) value (AOD1) based on the first PMI report; 2) determining a second AOD value (AOD2) based on the second PMI report; and 3) calculating a third AOD value using the first AOD value and the second AOD value, wherein the third AOD value indicates the dominating propagation path to the radio transceiver device.

28. A network node comprising a dual polarized antenna arrangement according to claim 27.

29. A wireless terminal comprising a dual polarized antenna arrangement according to claim 27.

30. A dual polarized antenna arrangement for beam forming, comprising:
a memory; and
a processing unit coupled to the memory and comprising one or more processors, the processing unit being configured to:
cause a dual polarized antenna array for beam forming to simultaneously transmit a first set of reference signals for acquiring channel state information in a first polarization direction and a second set of reference signals for acquiring channel state information in a second polarization direction, respectively;
cause said dual polarized antenna array for beam forming to receive quantized channel information based on at least one of the first set of reference signals and the second set of reference signals from a radio transceiver device;
estimate, based on the quantized channel information received from the radio transceiver device, a dominating propagation path to the radio transceiver device; and
determine transmission beams for transmission to the radio transceiver device, the transmission comprising precoder vectors and having relative orthogonal polarizations for beam forming according to the dominating propagation path to the radio transceiver device, wherein
the quantized channel information comprises a first precoding matrix indicator (PMI) report transmitted by the radio transceiver device and a second PMI report transmitted by the radio transceiver device, and the processing unit is configured to estimate the dominating propagation path by: 1) determining a first angle of departure (AOD) value (AOD1) based on the first PMI report; 2) determining a second AOD value (AOD2) based on the second PMI report; and 3) calculating a third AOD value using the first AOD value and the second AOD value, wherein the third AOD value indicates the dominating propagation path to the radio transceiver device.

31. A computer program product comprising a non-transitory computer readable medium storing a computer program for beam forming, the computer program comprising computer program code which, when run on a processing unit of an antenna apparatus comprising a dual polarized antenna array for beam forming, causes the antenna apparatus to:

cause said dual polarized antenna array for beam forming to alternatingly transmit a first set of reference signals for acquiring channel state information using a dual polarized antenna array in a first polarization direction and in a second polarization direction, respectively;

cause said dual polarized antenna array for beam forming to receive quantized channel information based on the first set of reference signals from a radio transceiver device;

estimate, based on the quantized channel information received from the radio transceiver device, a dominating propagation path to the radio transceiver device; and determine transmission beams for transmission to the radio transceiver device, the transmission comprising precoder vectors and having relative orthogonal polarizations for beam forming according to the dominating propagation path to the radio transceiver device, wherein the quantized channel information comprises a first precoding matrix indicator (PMI) report transmitted by the radio transceiver device and a second PMI report transmitted by the radio transceiver device, and the computer program is configured to estimate the dominating propagation path by: 1) determining a first angle of departure (AOD) value (AOD1) based on the first PMI report; 2) determining a second AOD value (AOD2) based on the second PMI report; and 3) calculating a third AOD value using the first AOD value and the second AOD value, wherein the third AOD value indicates the dominating propagation path to the radio transceiver device.

32. A computer program product comprising a non-transitory computer readable medium storing a computer program for beam forming, the computer program comprising computer program code which, when run on a processing unit of an antenna apparatus comprising a dual polarized antenna array for beam forming, causes the antenna apparatus to:

cause said dual polarized antenna array for beam forming to simultaneously transmit a first set of reference signals for acquiring channel state information in a first polarization direction and a second set of reference signals for acquiring channel state information in a second polarization direction, respectively;

cause said dual polarized antenna array for beam forming to receive quantized channel information based on at least one of the first set of reference signals and the second set of reference signals from a radio transceiver device;

estimate, based on the quantized channel information received from the radio transceiver device, a dominating propagation path to the radio transceiver device; and determine transmission beams for transmission to the radio transceiver device, the transmission comprising precoder vectors and having relative orthogonal polarizations for beam forming according to the dominating propagation path to the radio transceiver device, wherein the quantized channel information comprises a first precoding matrix indicator (PMI) report transmitted by the radio transceiver device and a second PMI report transmitted by the radio transceiver device, and the computer program is configured to estimate the dominating propagation path by: 1) determining a first angle of departure (AOD) value (AOD1) based on the first PMI report; 2) determining a second AOD value (AOD2) based on the second PMI report; and 3) calculating a third AOD value using the first AOD value and the second AOD value, wherein the third AOD value indicates the dominating propagation path to the radio transceiver device.

* * * * *

UNITED STATES PATENT AND TRADEMARK OFFICE
CERTIFICATE OF CORRECTION

PATENT NO.        : 9,654,264 B2
APPLICATION NO.   : 14/358119
DATED             : May 16, 2017
INVENTOR(S)       : Athley et al.

It is certified that error appears in the above-identified patent and that said Letters Patent is hereby corrected as shown below:

On the Title Page

In Item (72), under "Inventors", in Column 1, Line 2, delete "Savedalen" and insert -- Sävedalen --, therefor.

In the Drawings

In Fig. 13, Sheet 6 of 6, delete Tag "S102" and insert Tag -- S202 --, therefor.

In the Specification

In Column 3, Line 21, delete "eight" and insert -- eighth --, therefor.

In Column 3, Line 43, delete "eight" and insert -- eighth --, therefor.

In Column 3, Line 46, delete "eight" and insert -- eighth --, therefor.

In Column 3, Line 57, delete "fifth sixth, seventh, eight," and insert -- fifth, sixth, seventh, eighth, --, therefor.

In Column 3, Line 61, delete "eight," and insert -- eighth, --, therefor.

In Column 4, Line 49, delete "LIE" and insert -- LTE --, therefor.

In Column 5, Line 14, delete "may used" and insert -- may be used --, therefor.

In Column 7, Line 14, delete "FIGS. 8 9," and insert -- FIGS. 8, 9, --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,654,264 B2

In Column 7, Line 57, delete "1f" and insert -- 1f' --, therefor.

In Column 7, Line 60, delete "FIG. 10" and insert -- FIG. 10, --, therefor.

In Column 7, Line 66, delete "1f" and insert -- 1f" --, therefor.

In Column 8, Line 2, delete "FIG. 11" and insert -- FIG. 11, --, therefor.

In Column 8, Line 43, delete "antenna arrangement 1" and insert -- antenna arrangement 40 --, therefor.

In Column 8, Line 55, delete "antenna arrangement 1" and insert -- antenna arrangement 40 --, therefor.

In Column 12, Line 60, delete "S108,S108a," and insert -- S108, S108a, --, therefor.